United States Patent [19]

Ichikawa et al.

[11] Patent Number: 5,220,459
[45] Date of Patent: Jun. 15, 1993

[54] OPTICAL DISK DRIVING WITH INERTIAL DAMPING SPRING SUPPORTING LENS HOLDER

[75] Inventors: Atsushi Ichikawa, Tsukuba; Akira Saito, Odawara; Yukio Sumiya, Ibaraki, all of Japan

[73] Assignee: Hitachi, Ltd., Tokyo, Japan

[21] Appl. No.: 737,131

[22] Filed: Jul. 29, 1991

[30] Foreign Application Priority Data

Aug. 21, 1990 [JP] Japan .................................. 2-219405

[51] Int. Cl.$^5$ .............................................. G11B 7/00
[52] U.S. Cl. ..................................... 359/811; 359/813; 359/815; 359/814; 369/44.14; 369/44.15
[58] Field of Search ............... 369/44.15, 44.14, 44.11, 369/44.21; 359/824, 814, 811, 813, 815

[56] References Cited

U.S. PATENT DOCUMENTS

| | | | |
|---|---|---|---|
| 4,702,555 | 10/1987 | Iguma et al. | 359/814 |
| 4,750,164 | 6/1988 | Nose | 359/814 |
| 4,794,580 | 12/1988 | Ikedo et al. | 359/824 |
| 4,927,235 | 5/1990 | Narumi | 359/824 |
| 5,007,712 | 4/1991 | Kikuchi et al. | 359/813 |
| 5,018,836 | 5/1991 | Noda et al. | 359/824 |
| 5,073,882 | 12/1991 | Sasaki | 359/824 |

*Primary Examiner*—Paul M. Dzierzynski
*Assistant Examiner*—Kim-Kwok Chu
*Attorney, Agent, or Firm*—Evenson, McKeown, Edwards & Lenahan

[57] ABSTRACT

An optical disc driving device for use in an optical disc apparatus is equipped with an objective lens, a lens holder for holding this lens, and upper and lower support springs for supporting the lens holder. Each support spring consists of a pair of conductive springs which are electrically separated from each other in a plane. Each pair of conductive springs includes straight spring sections extending straight to pass a central axis which is parallel to the optical axis of the lens holder and which passes the center of gravity of the same. End portions of these conductive springs are joined to the lens holder by means of rubber members.

21 Claims, 3 Drawing Sheets

OPTICAL DISK DRIVING WITH INERTIAL DAMPING SPRING SUPPORTING LENS HOLDER

BACKGROUND OF THE INVENTION

1. Field of the Invention

The present invention relates to a device for driving the objective lens of an optical disc apparatus for optically recording or reading information on or from an information recording medium.

2. Description of the Related Art

Generally, to write or read information to or from an optical disc with accuracy by means of an optical disc apparatus, it is necessary to perform a focus control operation to control the distance between the objective lens and the optical disc with respect to any warp of the optical disc, and a tracking control operation to allow the objective lens to cope with any eccentricity in the information track on the optical disc. To perform these control operations, an optical disc apparatus is equipped with an objective lens driving device for moving the objective lens in the focusing and tracking directions.

The objective lens driving device includes a lens holder for supporting the objective lens. This lens holder is supported by a plurality of springs and is equipped with focusing coils and tracking coils. Attached to the base of the lens holder are magnets which are opposed to the focusing and tracking coils.

An example of such an objective lens driving device is disclosed in Japanese Patent Unexamined Publication No. 64-7344. The device disclosed has in its upper and lower sections a pair of mutually crossing connecting members connected at one end to the base of the device and at the other end to the lens holder, through the intermediation of an elastic joint. In this device, focus control is effected along an axis passing the center of gravity of a movable device section and extending in parallel with the optical axis of the objective lens, and tracking control is effected by rotating the movable device section around the above-mentioned axis. The movable device section is supported by a link mechanism in such a manner as to be only capable of the movements in the direction of and around the above-mentioned axis, which passes the center of gravity of the movable device section. Therefore, if it receives an inertial force at the time of access, the device does not undergo any vibration, so that the access time can be relatively short.

A problem with the above prior-art objective lens driving device is that it has an excessive height due to the crossing structure of the connecting members. Furthermore, a single connecting member is composed of five parts: the end portions, the link in the middle, and the elastic joint members. In addition to this large number of parts, this device requires a three-dimensional assembling operation, which is rather difficult to perform.

SUMMARY OF THE INVENTION

The present invention has been made with a view to solving the above-mentioned problems. It is accordingly an object of this invention to provide an objective lens driving device in which the vibration due to any inertial force applied thereto at the time of access can be damped and which is small-sized and easy to assemble.

In accordance with this invention, there is provided an objective lens driving device comprising: a lens holder equipped with focusing coils for moving an objective lens in the direction of the optical axis thereof and tracking coils for rotating the objective lens in a plane substantially perpendicular to the optical axis; magnetic circuits opposed to the focusing coils and the tracking coils; and an upper and a lower support springs of substantially the same configuration which support the lens holder and each of which consists of a pair of conductive springs electrically separated from each other in a plane, the conductive springs having straight spring sections which pass the center of gravity of a movable device section including the lens holder and which extend radially in the above-mentioned plane.

In another aspect of this invention, there is provided an objective lens driving device, wherein the lens holder is supported by an upper and a lower support springs of substantially the same configuration each of which consists of a pair of conductive springs electrically separated from each other in a plane, the conductive springs having straight spring sections which pass a central axis portion passing the center of gravity of a movable device section including the lens holder and which radially extend in the above-mentioned plane, and front end portions of each pair of conductive springs being connected to each other by means of an insulating connecting member.

In still another aspect of this invention, there is provided an objective lens driving device, wherein the lens holder is supported by an upper and a lower support springs of substantially the same configuration and arranged parallel to each other, each consisting of two conductive springs electrically separated from each other in a plane and having straight spring sections which pass a central axis portion passing the center of gravity of a movable device section including the lens holder and which radially extend in the above-mentioned plane, at least one of the upper and lower support springs being equipped with an adjustment means for effecting fine adjustment of its relative position with respect to the other so as to set the above-mentioned optical axis perpendicular to the plane of a disc.

Other objects and features of the present invention will become apparent from the following description.

DESCRIPTION OF THE PREFERRED EMBODIMENT

An embodiment of the present invention will now be described with reference to the accompanying drawings.

Figure 1:
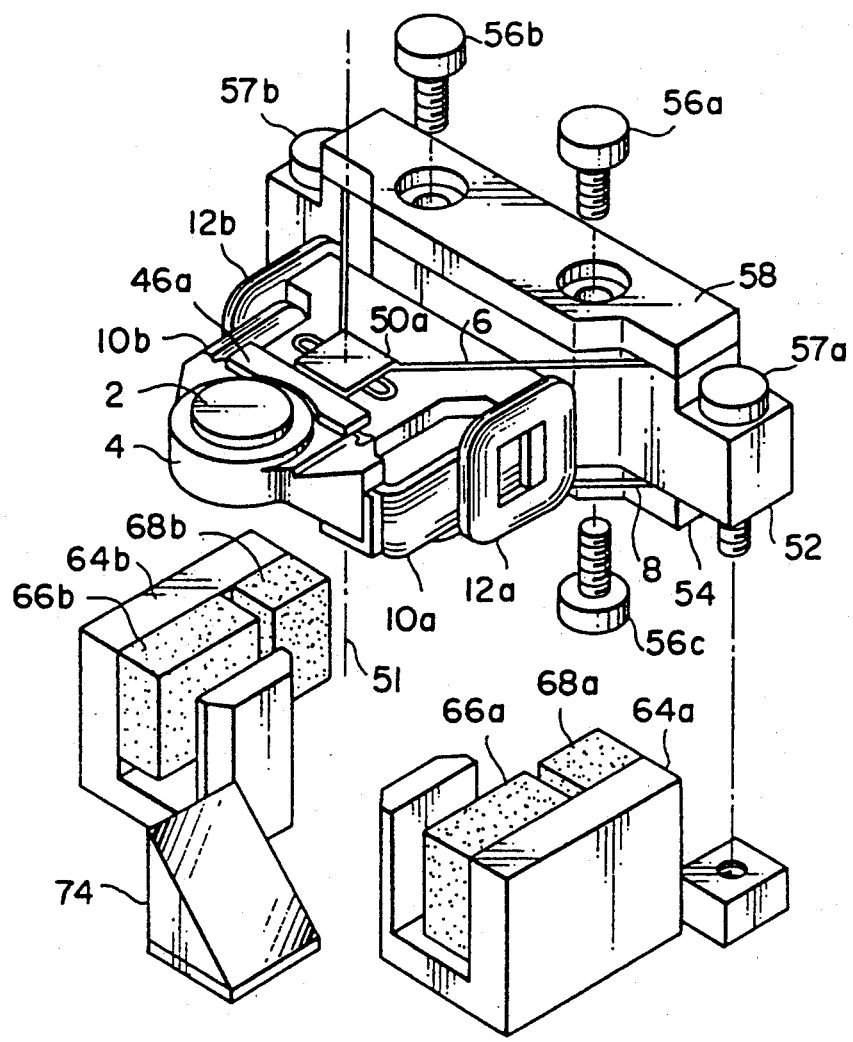
FIG. 1 is an exploded perspective view of an embodiment of the present invention.
Figure 2:
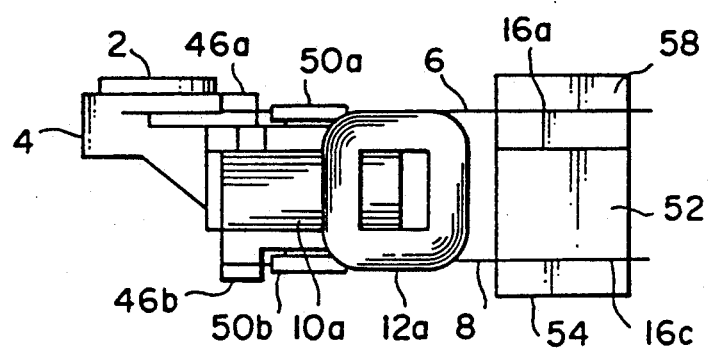
FIG. 2 is a front view of this embodiment.
Figure 3:
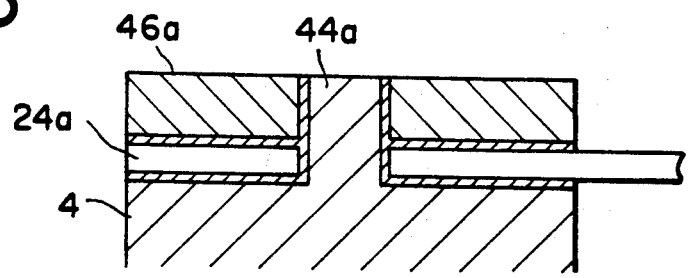
FIG. 3 is a sectional view of a support spring gluing section.
Figure 4:
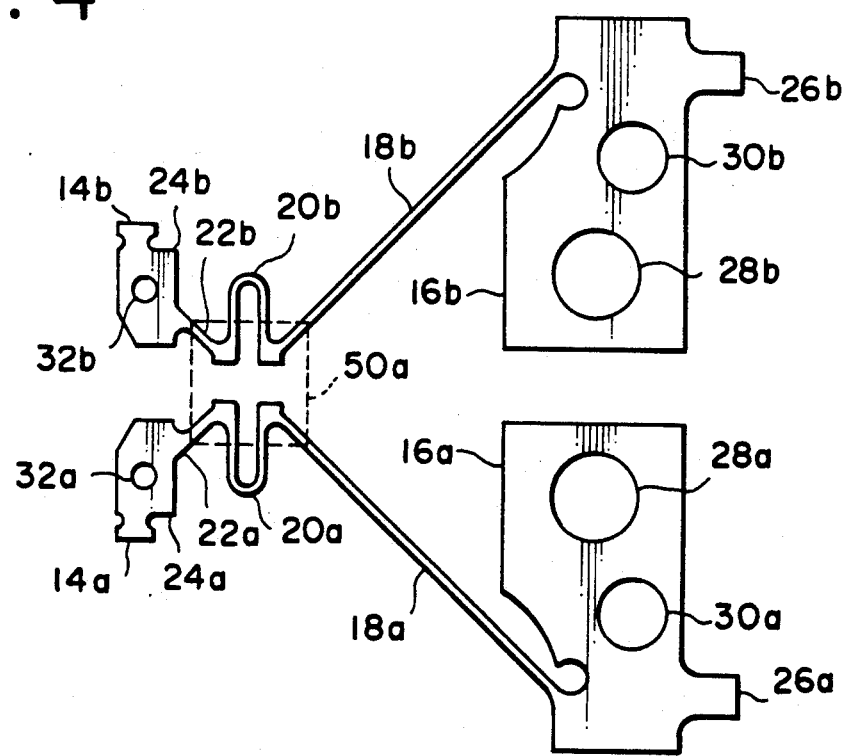
FIG. 4 is a plan view of an upper support spring.
Figure 5:
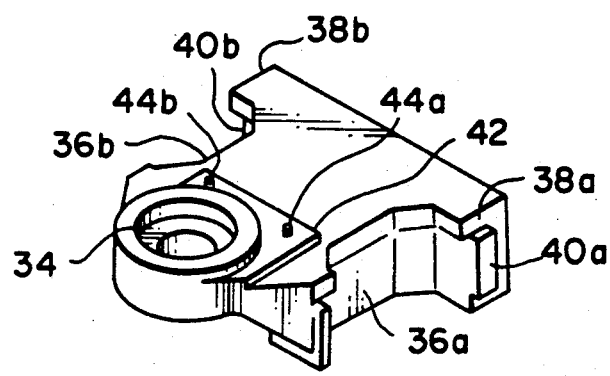
FIG. 5 is a perspective view of a lens holder.

FIG. 1 is an exploded perspective view of an objective lens driving device in accordance with this embodiment; FIG. 2 is a front view of this embodiment; FIG. 3 is a sectional view of a support spring gluing section; and FIG. 4 is a plan view of an upper support spring.

A lens holder 4 holding an objective lens 2 in its front end portion is supported by support springs 6 and 8 of the same configuration. Focusing coils 10a and 10b are respectively glued to each side of the lens holder 4. Further, on each side of the lens holder 4, tracking coils 12a and 12b are respectively glued to the focusing coils 10a and 10b and to the rear end portion of the lens holder.

The focusing coils 10a and 10b are connected in series to each other, with the remaining ends of these coils being respectively soldered to end sections 14a and 14b provided at one end of the support spring 6. The tracking coils 12a and 12b are likewise connected in series to each other, with the remaining ends thereof being likewise soldered to two end sections of the support spring 8. As shown in FIG. 4, each of the support springs 6, each constituting a conductive spring, and 8 each constituting a conductive spring is composed of two symmetrical sections, which are respectively equipped with clamping sections 16a and 16b, straight spring sections 18a and 18b, bent sections 20a and 20b, connecting sections 22a and 22b, holder gluing sections 24a and 24b, and soldering sections (14a and 26a) and (14b and 26b) provided at each end. The clamping sections 16a and 16b are respectively equipped with fastening-screw holes 28a and 28b and relief holes 30a and 30b for fine adjustment, and the holder gluing sections 24a and 24b are respectively equipped with holes 32a and 32b for positioning and increasing gluing strength.

The lens holder 4 has in its front end portion a hole 34 for holding an objective lens 2, which is engaged with this hole and fixed thereto by gluing. Provided on either side of the lens holder 4 are recesses 36a and 36b. The focusing coils 10a and 10b are respectively fitted into these recesses and fixed thereto by gluing. Provided behind these recesses are flat portions 38a and 38b to which the tracking coils 12a and 12b are to be glued and protrusions 40a and 40b for positioning the tracking coils 12a and 12b. Provided in the front portion of the lens holder 4 is a support spring gluing section 42, which is somewhat raised. Provided on this support spring gluing section are cylindrical projections 44a and 44b for positioning the support springs.

These cylindrical projections 44a and 44b are inserted into the holes 32a and 32b provided in the gluing sections of the support spring and glued thereto. The gluing is reinforced by a presser plate 46a, which is glued to the support spring gluing section 42 from above. The attachment of the lower support spring 8 is effected in the same manner.

The respective symmetrical parts of the support springs 6 and 8 are joined together in the middle section by means of rubber members 50a and 50b, respectively, whose bottom surfaces are attached to the lens holder 4. The clamping sections 16c and 16b of the lower support spring 8 are fastened to an actuator holder 52 by means of fastening screws 56c and 56d (the latter of which is not shown) and a fastening plate 54.

The clamping sections 16a and 16b of the upper support spring 6 are fastened to the actuator holder 52 by means of fastening screws 56a and 56b and a fastening plate 58. Small holes 60a and 60b are provided on the upper surface of the actuator holder 52. The fastening plate 58 has elongated holes 62a and 62b, which are arranged in correspondence with the small holes 60a and 60b. By pressing an eccentric driver against the inner walls of the elongated holes 62a and 62b, the fastening plate 58 is moved, thereby displacing the upper support spring 6, and consequently, the fastening plate 58 previously attached thereto, with respect to the lower support spring 8. In this way, the attitude angle of the lens holder 4 is adjusted.

Holes are provided in either end portion of the actuator holder 52. The diameter of these holes are larger than that of fastening screws 57a and 57b, by means of which the actuator holder 52 is fastened to an optical head case 70 to be described below. By virtue of the gaps between the holes at either end of the actuator holder 52 and the fastening screws 57a and 57b, the actuator holder 52 can be displaced with respect to the case 70. By displacing the actuator holder 52, the position of the lens holder 4, whose attitude angle is adjusted, can be moved in such a manner as to change the position of the optical axis of the objective lens 2, within a plane orthogonal to the optical axis thereof.

Permanent magnets 66a and 68a are glued to a yoke 64a, with their polarizing directions opposite to each other. The focusing coil 10a and one side of the tracking coil 12a are inserted into the magnetic gap between the center yoke of the yoke 64a and the permanent magnet 66a. The other side of the tracking coil 12a is opposed to the permanent magnet 68a. Symmetrically with respect to the lens holder 4, another yoke 64b and permanent magnets 66b and 68b are arranged in a similar manner.

The objective lens 2, the lens holder 4, the focusing coils 10a and 10b, the tracking coils 12a and 12b, the rubber members 50a and 50b, and the presser plates 46a and 46b, constitute the movable section of this objective lens driving device. The center of gravitation axis 51 of the movable device section extends in parallel with the optical axis of the objective lens 2. The straight spring sections 18a and 18b of the support spring 6 and the straight spring sections 18c and 18d (not shown) of the support spring 8 are arranged to extend radially from this center of gravitation axis 51. The tracking coils 12a and 12b are arranged on the opposite side of the objective lens 2 with respect to the center gravitation axis 51 and constitute a part of its counterweight. Since it is not necessary to provide a separate part as a counterweight, the weight of this movable device section can be relatively small.

Figure 7:
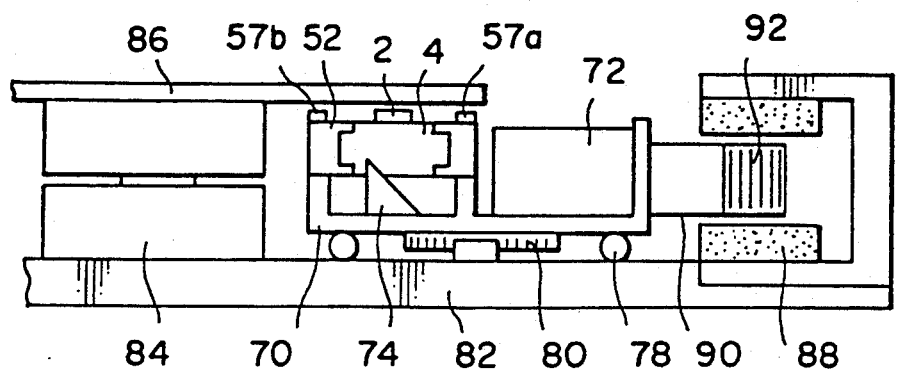
FIG. 7 is a plan view of an optical disc apparatus in which the above embodiment is incorporated.

As shown in FIG. 7, the objective lens driving device, constructed as described above, is lodged in the optical head case 70. In addition to the driving device, the head case 70 lodges an optical system 72 including a light source and optical systems for information detection and servo signal detection, and a raising mirror 74, which is fixed to the case 70. Guide rollers 78 and an external scale 80 are attached to the case 70.

The above-mentioned guide rollers engage with a guide bar (not shown) provided on the apparatus base 82. Due to this structure, the case 70 can move straight towards the center of a spindle motor 84 attached to the apparatus base 82. An optical disc 86 having on its surface a spiral information track is attached to the spindle motor 84 and rotated at a constant speed. A magnetic circuit 88 is attached to one end of the apparatus base 82. A moving-coil-type linear motor 92 which is attached to the case 70 through the intermediation of a connecting section 90 is arranged opposite to the magnetic circuit 88. Electric current supply causes the entire case 70 to be displaced and positioned in the radial direction of the optical disc 86.

Next, the operation of this objective lens driving device, constructed as described above, will be explained. When the rotating speed of the optical disc 86 attached to the spindle motor 84 has attained a predetermined value, electric current flows through the focusing coils 10a and 10b in accordance with instructions from a control circuit (not shown), whereby the lens holder 4 is raised. The setting on the information recording surface of the optical disc 86 is detected by the servo detection optical system. Afterwards, servo control is so effected that the focus is constantly kept on this information recording surface. Since the focusing coils 10a and 10b are structured symmetrically with respect to the center of gravitation axis 51 of the movable device section, the resultant force of these two coils coincides with the center of gravitation axis 51, with its direction coinciding with the optical axis of the objective lens.

When moving the objective lens to an arbitrary information track on the optical disc, the entire case 70 is moved at high speed. This movement will be referred to as rough access. In this rough access, the inertial force of the movable device section is applied to the support springs 6 and 8 of the objective lens driving device. Since, however, the front end portions of the straight spring sections 18a through 18d are firmly joined together by the hard rubber members 50a and 50b and attached to the lens holder, the movable device section does not move in the translational direction. Further, the above joint portions consisting of hard rubber members are positioned in the center of gravitation axis 51 of the movable device section, so that no rotational moment is generated which would cause the lens holder to rotate. Thus, if an inertial force is applied thereto during rough access, the lens holder 4 does not undergo any displacement or vibration, so that fine displacement of it can be effected immediately after rough access.

Figure 6:
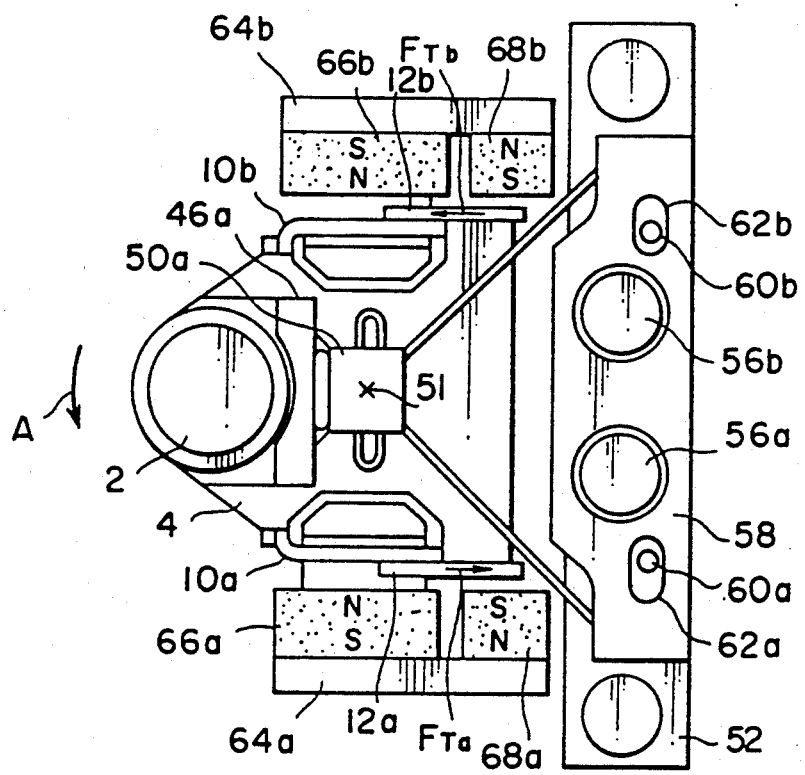
FIG. 6 is a plan view of the above embodiment.

The fine displacement of the movable device section is effected by supplying the tracking coils 12a and 12b with electric current to generate therein a couple of forces $F_{Ta}$ and $F_{Tb}$ as shown in FIG. 6, which cause the movable device section to rotate in the direction indicated by the arrow A of FIG. 6, thereby displacing the objective lens 2 attached to the front end of the movable device section. Due to the couple of forces $F_{Ta}$ and $F_{Tb}$, the movable device section rotates around the center of gravitation axis 51. Since, as stated above, the support springs 6 and 8 support the movable device section by means of the straight spring sections 18a through 18d, which pass the center of gravitation, axis 51 the movable device section exhibits low rigidity with respect to the rotation around the center of gravity, so that it rotates in a smooth manner, without generating any unnecessary vibration.

The role played by the rubber members 50a and 50b joining support spring portions to each other will be described in more detail. An effect similar to that described above might be obtained even if these members were made of hard plastic instead of rubber. However, with metal springs and hard plastic members, it would be difficult to cope with a force generating a rigid-body-mode vibration of a still higher frequency (e.g., approx. 1 KHz) because of the absence of a member which would help to damp such a rigid-body-mode vibration (pitching, rolling, translation, etc.). Accordingly, the vibration would last for a long period, deteriorating the precision with which the objective lens is positioned.

Such a rigid-body-mode vibration is generated when the couple of forces generated in the focusing coils 10a and 10b are applied offset with respect to the center of gravity or when the forces generated in the tracking coils 12a and 12b are unbalanced, causing the rotating force to be offset with respect to the center of gravitation axis 51 and allowing a force in the translational direction to be applied.

The bent sections 20a and 20b of the support springs are provided for the purpose of lowering the rigidity of the metal springs, i.e., preventing deterioration in the damping effect of the rubber members 50a and 50b when the rigidity of the metal springs is excessively high as compared to that of the rubber members.

In accordance with this invention, the thickness of the support springs are small, so that the entire objective lens driving device can be made relatively thin. Further, since the support springs can also serve as the lead wires of the focusing coils or the tracking coils, the lead wire arrangement can be facilitated, thereby reducing the device size, the assembling time, etc.

In the above-described embodiment, both the objective lens driving device and the optical system 72 are provided in the optical head case 70, with the entire case 70 being movable. The operation of the objective lens driving device remains basically the same if some other type of optical system is adopted, providing the same effect as described above.

What is claimed is:

1. An objective lens driving device comprising:
   an objective lens; a movable device section including a lens holder for holding the objective lens and equipped with focussing coils for moving the objective lens in the direction of the optical axis thereof and tracking coils for rotating the objective lens in a plane substantially perpendicular to the optical axis; magnetic circuits opposed to said focussing coils and said tracking coils; and upper and lower support springs of substantially the same configuration which support said lens holder and each of which consist of a pair of conductive springs electrically separated from each other in a plane, each of said conductive springs having a longitudinal axis which extends radially from a center of gravity axis of said movable device section.

2. An objective lens driving device according to claim 1, wherein said tracking coils are operatively arranged to rotate said movable device section about said center of gravity axis.

3. An objective lens driving device comprising:
   an objective lens; a movable device section including a lens holder for holding the objective lens and equipped with focusing coils for moving the objective lens in the direction of the optical axis thereof and tracking coils for rotating the objective lens in a plane substantially perpendicular to the optical axis; magnetic circuits opposed to said focussing coils and said tracking coils; and an upper and a lower support springs of substantially the same configuration and arranged parallel to each other which support said lens holder and each of which consists of a pair of conductive springs electrically separated from each other in a plane, each of said conductive springs having a longitudinal axis which extends radially from a center of gravity axis of said movable device section, end portions of each pair of conductive springs being connected to each other by an insulating connecting member.

4. An objective lens driving device as claimed in claim 3, wherein said connecting member is formed of a material having a vibration damping characteristic.

5. An objective lens driving device as claimed in claim 3, wherein bent sections are provided in those portions of said pair of conductive springs.

6. An objective lens driving device according to claim 3, wherein said tracking coils are operatively arranged to rotate said movable device section about said center of gravity axis.

7. An objective lens driving device comprising:
an objective lens; a movable device section including a lens holder for holding the objective lens and equipped with focussing coils for moving the objective lens in the direction of the optical axis thereof and tracking coils for rotating the objective lens in a plane substantially perpendicular to the optical axis; magnetic circuits opposed to said focussing coils and said tracking coils; and upper and lower support springs of substantially the same configuration for supporting said lens holder and each consisting of a pair of conductive springs electrically separated from each other in a plane, each of said conductive springs having a longitudinal axis which extends radially from a center of gravity axis of said movable device section, and at least one of said upper and lower support springs being equipped with an adjustment means for effecting fine adjustment of its relative position with respect to the other support spring so as to set said optical axis perpendicular to a disc plane.

8. An objective lens driving device according to claim 7, wherein said tracking coils are operatively arranged to rotate said movable device section of about said center of gravity axis.

9. An objective lens driving device comprising:
an objective lens; a lens holder serving to hold the objective lens and equipped with focusing coils for moving the objective lens in the focusing direction to control the distance between the objective lens and an optical disc and tracking coils for moving the objective lens in the tracking direction to control the objective lens such as to follow any eccentricity in the information track of said optical disc; magnetic circuits opposed to said focussing coils and said tracking coils; and support springs for supporting said lens holder; said support springs consisting of a pair of conductive springs each having a longitudinal axis which extends radially from a center of gravity axis of said lens holder, said support springs being joined with said lens holder at the center of gravity axis portion by insulating connecting members, and said tracking coils and said focusing coils being electrically connected to end portions of said conductive springs.

10. An objective lens driving device as claimed in claim 9, wherein said connecting member is formed of a material having a vibration damping characteristic.

11. An objective lens driving device as claimed in claim 9, wherein bent sections are provided in those portions of said pair of conductive springs.

12. An objective lens driving device, according to claim 9, wherein said springs comprise straight spring sections which form a V-shaped.

13. An objective lens driving device according to claim 9, wherein said tracking coils are operatively arranged to rotate said objective lens about said center of gravity axis.

14. Apparatus for supporting a lens holder, comprising a pair of conductive springs separated from each other in a plane, each of said springs having a longitudinal axis which extends radially from a center of gravity axis of the lens holder.

15. The apparatus according to claim 14, wherein the lens holder is part of a movable device section.

16. In a method of rotating an objective lens in a plane substantially perpendicular to the optical axis, the step of rotating said lens about a center of gravity axis of said lens using conductive springs attached to the lens and separated from each other in a plane, each of said springs having a longitudinal axis which extends radially from a center of gravity axis of the lens holder.

17. In the method according to claim 16, wherein the lens is part of a movable device section which includes a lens holder for the lens, and the step of rotating comprises rotating said movable device section in a plane substantially perpendicular to the optical axis about a center of gravity axis of said movable device section.

18. An objective lens driving device having a movable device section with a lens holder, the improvement comprising:
upper and lower support springs of substantially the same configuration for supporting the lens holder of each of which consist of a pair of springs separated from each other in a plane, said springs each having a longitudinal axis which extends radially from a center of gravity axis of a movable device section including said lens holder.

19. An objective lens driving device having a movable device section with a lens holder according to claim 18, further comprising focusing coils for moving the objective lens in the focusing direction to control the distance between the objective lens and an optical disk; and tracking coils for moving the objective lens in the tracking direction to control the objective lens such as to follow any eccentricity in the information track of said optical disk.

20. On objective lens driving device having a movable device section with a lens holder according to claim 19, further comprising magnetic circuits opposed to set focusing coils and said tracking coils.

21. An objective lens driving device having a movable device section with a lens holder according to claim 18, wherein said springs are electrically conductive springs.

* * * * *